(No Model.)

C., W. & J. C. KNISPEL.
COOLING DEVICE FOR BARS OR REFRIGERATORS.

No. 600,227. Patented Mar. 8, 1898.

WITNESSES:
Wm. C. Camfield Jr.
Marcy B. Trusdell

INVENTORS:
CHRISTIAN KNISPEL,
WILLIAM KNISPEL, &
JOHN C. KNISPEL.
BY Fred C. Fraentzel, ATTORNEY.

UNITED STATES PATENT OFFICE.

CHRISTIAN KNISPEL, WILLIAM KNISPEL, AND JOHN C. KNISPEL, OF NEWARK, NEW JERSEY.

COOLING DEVICE FOR BARS OR REFRIGERATORS.

SPECIFICATION forming part of Letters Patent No. 600,227, dated March 8, 1898.

Application filed February 29, 1896. Serial No. 581,243. (No model.)

*To all whom it may concern:*

Be it known that we, CHRISTIAN KNISPEL, WILLIAM KNISPEL, and JOHN C. KNISPEL, citizens of the United States, residing at Newark, in the county of Essex and State of New Jersey, have invented certain new and useful Improvements in Cooling Devices for Bars or Refrigerators; and we do hereby declare the following to be a full, clear, and exact description of the invention, such as will enable others skilled in the art to which it appertains to make and use the same, reference being had to the accompanying drawings, and to letters of reference marked thereon, which form a part of this specification.

Our invention relates to an improved device for the cooling of malt or other like liquors; and the invention has for its object to provide a compact, neat, and convenient structure adapted to be used in connection with a bar or in a refrigerator; and a further object of this invention is to provide a device of this nature which can be readily disconnected from the supply-pipe through which the liquor passes and is provided with a detachable cover to enable the cleaning out of the inner parts of said cooling device.

The invention therefore consists in the construction of cooling device hereinafter set forth, and also in such novel arrangements and combinations of parts as will be further brought out in the accompanying specification and finally embodied in the clauses of the claim.

The invention is clearly illustrated in the accompanying sheet of drawings, in which—

Figure 1:
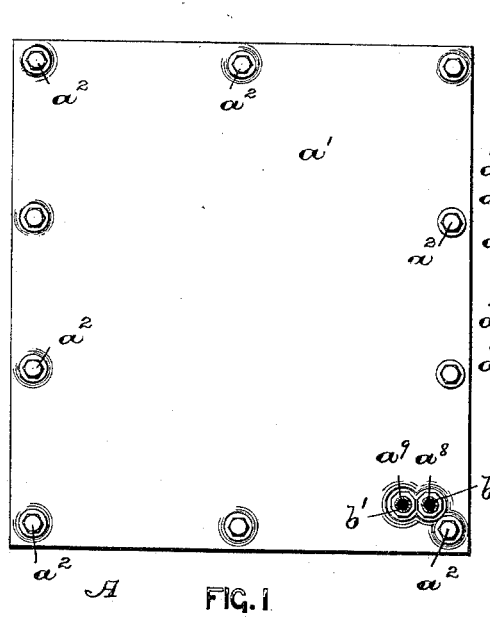
Figure 2:
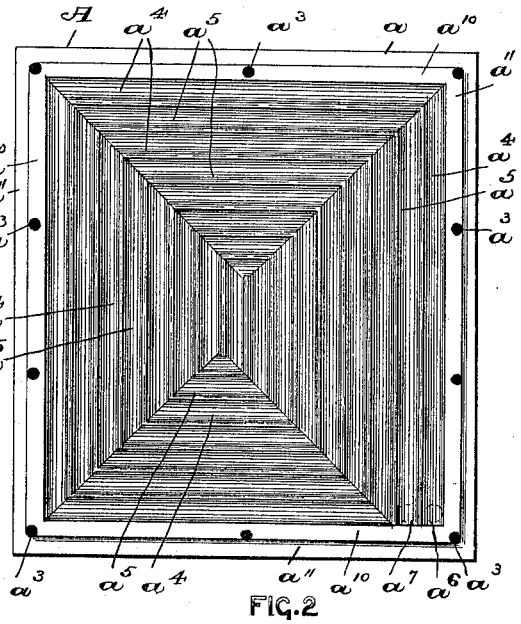
Figure 3:
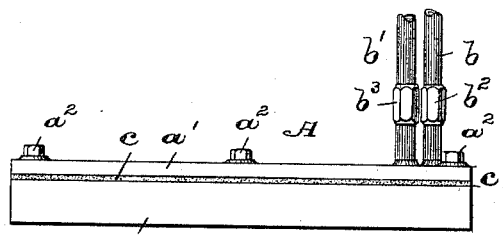
Figure 4:
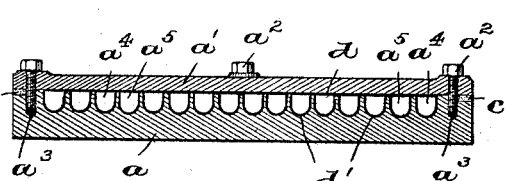

Figure 1 is a plan view of our novel construction of cooling device. Fig. 2 is a similar view of the said device with the cover removed. Fig. 3 is an end view of the said device, and Fig. 4 is a vertical cross-section of the same.

Similar letters of reference are employed in all of the above-described views to indicate corresponding parts.

In said drawings, A indicates the complete cooling device, which consists, essentially, of a casing $a$, having a cover or lid $a'$, which can be securely fastened to said casing by means of screws or bolts $a^2$, which are passed through perforations in said cover $a'$ and screw into the screw-threaded holes $a^3$ in the casing $a$. As will be seen from an inspection of Figs. 2 and 4, the said casing $a$ is provided with parallel grooves or channels $a^4$ and $a^5$, which meet at the center of the casing, said channels forming a maze-like structure or labyrinth, as will be clearly evident. As will be seen from Fig. 2, the casing $a$ is made angular in outline, and said channels $a^4$ and $a^5$ are formed by straight walls which are parallel with the sides of said angular casing, whereby the walls of the channels intersect each other, as in the present instance, at right angles. This feature is of advantage in that it greatly retards the flow of the liquid through the cooling device, and hence the liquid is more rapidly cooled and retains an even temperature. Directly above the end portions $a^6$ and $a^7$ of the respective channels $a^4$ and $a^5$ in the cover $a'$ are two openings $a^8$ and $a^9$, with which are connected the inlet-pipe $b$ and the outlet-pipe $b'$, respectively. Thus it will be seen that the liquor coming in at the pipe $b$ passes into the channel $a^4$ at $a^6$ and through the several channels $a^4$ until it reaches the center of the casing $a$, and then it continues to flow into the channels $a^5$, finally reaching the point $a^7$, from whence it passes out into the pipe $b'$. Said casing $a$ is preferably formed with a raised portion $a^{10}$, which surrounds the maze-like structure and forms a suitable offset $a^{11}$, in which we arrange a gasket $c$, of pasteboard or other suitable packing material, to produce a tight joint and to prevent the leakage of the liquor when the latter is forced under pressure through the said channels $a^4$ and $a^5$ in the cooling device. The said channels are covered with a suitable enamel $d$ or other similar material, while the bottom of the cover $a'$ may likewise be covered with an enamel $d'$, as clearly represented in Fig. 4.

In order that the cover $a'$ can be readily removed from the casing $a$ when it is desired to clean the same, we have arranged in the pipe $b$ a union or nipple $b^2$ and in the pipe $b'$ a similar union or nipple $b^3$, both of which can be readily unscrewed and the casing $a$ and its cover disconnected from the pipes $b$ and $b'$, when the cooling device A can be lifted from the ice-chamber in the bar or refrigerator, the cover $a'$ removed, and the inner parts of the device readily scoured, after which it can be replaced with but very little trouble.

Of course it will be evident that the casing $a$ and the cover $a'$ may be of any suitable angular shape, either square or otherwise, and the holes $a^8$ and $a^9$ for the reception of the pipes $b$ and $b'$ may be in the bottom or the side of the casing instead of in the cover $a'$, as will be clearly evident.

Having thus described our invention, what we claim is—

1. The herein-described structure for cooling liquids, consisting, essentially, of a casing $a$ having a maze-like and angular arrangement of channels or grooves $a^4$ and $a^5$, forming inlet and outlet passages arranged side by side, extending from one corner of the casing and meeting at the center thereof, a cover on said casing, and an inlet and outlet connecting with said channels $a^4$ and $a^5$ respectively, substantially as and for the purposes set forth.

2. The herein-described structure for cooling liquids, consisting, essentially, of a casing $a$ having a maze-like and angular arrangement of channels or grooves $a^4$ and $a^5$, forming inlet and outlet passages arranged side by side, extending from one corner of the casing and meeting at the center thereof, a cover on said casing, a packing between said casing and cover, means for detachably securing said cover to said casing, and holes $a^8$ and $a^9$ in said cover, communicating directly with said channels $a^4$ and $a^5$, substantially as and for the purposes set forth.

3. The herein-described structure for cooling liquids, consisting, essentially, of a casing $a$ having a maze-like and angular arrangement of channels or grooves $a^4$ and $a^5$, forming inlet and outlet passages arranged side by side, extending from one corner of the casing and meeting at the center thereof, a cover on said casing, a packing between said casing and cover, means for detachably securing said cover to said casing, and holes $a^8$ and $a^9$ in said cover, communicating directly with said channels $a^4$ and $a^5$, in combination, with an inlet-pipe $b$, having a union or nipple $b^2$, and an outlet pipe $b'$ having a union or nipple $b^3$, whereby said cooling device can be separated from said pipes, substantially as and for the purposes set forth.

In testimony that we claim the invention set forth above we have hereunto set our hands this 26th day of February, 1896.

CHRISTIAN KNISPEL.
WILLIAM KNISPEL.
JOHN C. KNISPEL.

Witnesses:
FREDK. C. FRAENTZEL,
WM. H. CAMFIELD, Jr.